United States Patent Office 3,060,176
Patented Oct. 23, 1962

3,060,176
12α-HALO-Δ⁴-PREGNENE-11β,16α,21-TRIOLS AND PROCESS FOR PRODUCTION THEREOF
Patrick A. Diassi, Westfield, Allen I. Laskin, Somerset, and Pacifico A. Principe, South River, N.J., assignors to Olin Mathieson Chemical Corporation, New York, N.Y., a corporation of Virginia
No Drawing. Filed Feb. 19, 1962, Ser. No. 174,267
18 Claims. (Cl. 260—239.55)

This invention relates to the synthesis of valuable steroids and has for its objects the provision of (a) new steroids which are useful intermediates in the preparation of physiologically active steroids, and (b) an advantageous process for preparing the same.

The process of this invention comprises subjecting a steroid of the general formula:

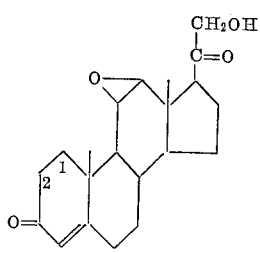

wherein the 1,2-position is saturated or double-bonded to the 16α-hydroxylating action of a microorganism, such as *Streptomyces roseochromogenus*, thereby yielding new intermediates of this invention of the general Formula I:

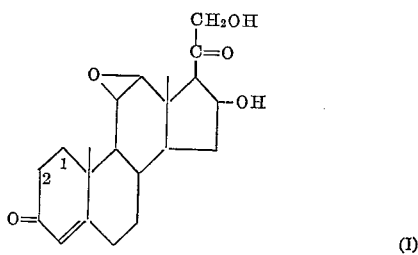

(I)

wherein the 1,2-position is saturated or double-bonded. The 16α,21-dihydroxy steroids are then converted to 21-halo-Δ¹⁶-derivatives, which are also new intermediates of this invention, of the general Formula II:

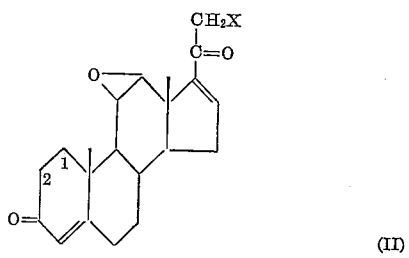

(II)

wherein the 1,2-position is saturated or double-bonded, and X is chlorine, bromine or iodine, by reaction with a sulfonyl halide, such as a lower alkane sulfonyl halide (e.g., methanesulfonyl chloride, methanesulfonyl bromide, methanesulfonyl iodide, and ethanesulfonyl chloride), or a substituted benzenesulfonyl halide (e.g., p-toluenesulfonyl chloride, p-toluenesulfonyl bromide, p-bromobenzenesulfonyl chloride and p-bromobenzenesulfonyl bromide) in the presence of a base, such as pyridine, at ambient temperature, preferably between −15° and 50° C.

Reaction of these 21-halo intermediates with an alkali metal or quaternary ammonium salt of a hydrocarbon carboxylic acid of less than twelve carbon atoms in the presence of an alkali metal iodide in an inert solvent, such as acetone, ethanol or methanol, gives new intermediates of this invention, namely, the corresponding 21-acyloxy steroids of the general Formula III:

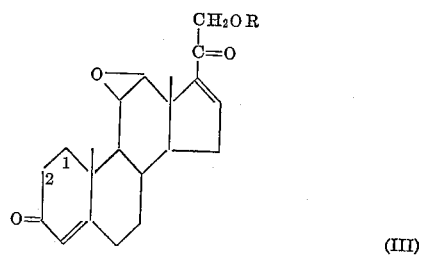

(III)

wherein the 1,2-position is saturated or double-bonded, and R is the acyl radical of a hydrocarbon carboxylic acid of less than twelve carbon atoms, as exemplified by the acyl radical of an alkanoic acid of less than twelve carbon atoms (e.g., acetic, propionic, butyric, pentanoic, hexanoic and octanoic acid), a monocyclic aromatic carboxylic acid (e.g., benzoic, and p-toluic acid), a monocyclic aromatic lower alkanoic acid (e.g., phenacetic and β-phenyl propionic acid), a monocyclic cycloalkanecarboxylic acid, a monocyclic cycloalkenecarboxylic acid, and an alkenoic acid of less than twelve carbon atoms.

These intermediates may then be hydrolyzed, as by treatment with a salt of a weak base and strong acid, such as potassium carbonate, to yield the corresponding free 21-hydroxy compounds of the general Formula IV:

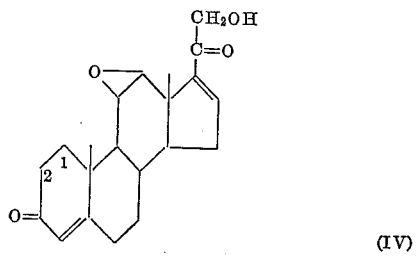

(IV)

wherein the 1,2-position is saturated or double-bonded. The 11β,12β-oxido group of Compounds III or IV are then opened by treatment with a hydrohalic acid (e.g., hydrofluoric acid, hydrochloric acid, hydrobromic acid or hydroiodic acid) to give the corresponding 12α-halo-11β-hydroxy steroids of the general Formula V:

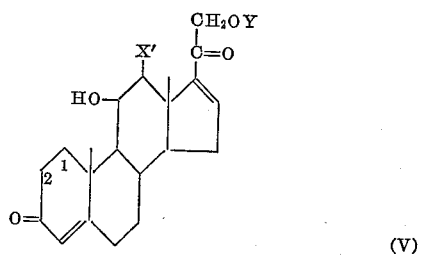

(V)

wherein the 1,2-position is saturated or double-bonded, Y is hydrogen or R, wherein R is as hereinbefore defined, and X' is halo.

Alternatively, those steroids of Formula V, wherein X' is fluorine can be obtained from steroids of Formula I by first esterifying the 16α- and 21-hydroxy groups by reaction with the acid anhydride or acyl chloride of a hydrocarbon carboxylic acid of less than twelve carbon atoms in the presence of a base, such as pyridine, to yield the new intermediates of this invention, of the general Formula VI:

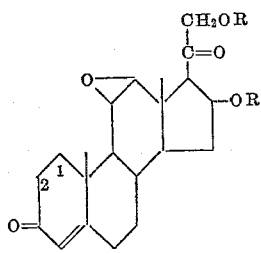

(VI)

wherein the 1,2-position is saturated or double-bonded and R is as hereinbefore defined. The 11β,12β-oxido group is then opened with hydrogen fluoride, preferably in chloroform and ethanol or tetrahydrofuran at −30° to 10° C., to give new steroids of this invention of the general Formula VII:

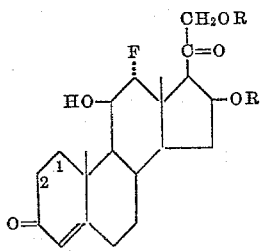

(VII)

wherein the 1,2-position is saturated or double-bonded and R is as hereinbefore defined.

Hydrolysis of the ester groups, by the process described hereinbefore, gives the new 16α,21-dihydroxy steroids of this invention of the general Formula VIII:

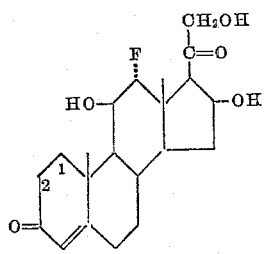

(VIII)

where the 1,2-position is saturated or double-bonded.

Compounds VIII are then reacted with a sulfonyl halide as described hereinbefore to yield new steroids of this invention of the general Formula IX:

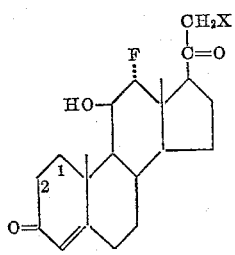

(IX)

wherein the 1,2-position is saturated or double-bonded. and X is as hereinbefore defined. These compounds are then converted to compounds of the Formula V, wherein X' is fluorine, by treatment with an alkali metal or quaternary ammonium salt of a hydrocarbon carboxylic acid of less than twelve carbon atoms, as described hereinbefore.

Treatment of compounds of the Formula V with osmium tetroxide, preferably in the presence of an organic base, such as pyridine, yields the osmate ester of the corresponding 16α,17α-dihydroxy derivative, which is then reduced and hydrolyzed, as by treatment with sodium sulfite or hydrogen sulfide, to give the free 16α,17α-dihydroxy derivatives of the formula:

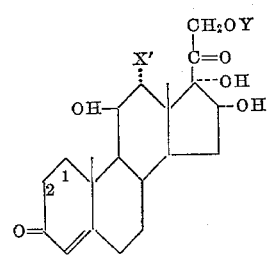

which are known steroids, reported to have anti-inflammatory properties.

The following examples illustrate the invention, all temperatures being in centigrade. The first three examples are directed to the preparation of starting steroids used in the process of this invention, and the remaining examples are directed to the processes of this invention.

EXAMPLE 1

*11β,12β-Oxido-Δ$^{1,4}$-Pregnadiene-3,20-Dione*

To a solution of 1.0 g. of 11β,12β-oxidoprogesterone in 50 ml. of purified dioxane 700 mg. of 2,3-dichloro-5,6-dicyanobenzoquinone are added and the resulting solution refluxed under nitrogen for six hours. After cooling the precipitated 2,3-dichloro-5,6-dicyanohydroquinone is filtered and washed with dioxane. The combined filtrate and washings are diluted with an equal volume of chloroform and adsorbed onto 40 g. of Woelm neutral alumina. Elution with chloroform and crystallization of the residue of the eluates from acetone-hexane gives 11β,12β-oxido-Δ$^{1,4}$-pregnadiene-3,20-dione.

EXAMPLE 2

*11β,12β-Oxidodesoxycorticosterone*

Surface growth from each of 2 three-week old agar slant cultures of *Wojnowicia graminis* NRRL 2472, the slant containing as a nutrient medium (A): glucose, 10 g.; Difco yeast extract, 2.5; K$_2$HPO$_4$, 1 g.; agar, 20 g.; and distilled water to 1 l., are suspended in 2.5 ml. of an 0.01% sodium lauryl sulfate aqueous solution. One milliliter portion of the suspension is used to inoculate four 250 ml. conical flasks, each containing 50 ml. of the following sterilized nutrient medium (B): dextrose, 10 g.; cornsteep liquor, 6 g.; NH$_4$H$_2$PO$_4$, 3 g.; Difco yeast extract, 2.5 g.; CaCl$_3$, 2.5; and distilled water to 1 l. After 4 days of incubation at 25° C. with continuous rotary agitation (280 cycles per minute, 2 inch radius), 10% (vol./vol.) transfers are made to twenty 250 ml. conical flasks each containing 50 ml. of fresh sterilized medium B. After an additional incubation period of three days, 10% transfers from these flasks are made to two hundred 250 ml. conical flasks each containing 50 ml. of fresh sterilized medium B. The steroid is added by adding to each flask 0.25 ml. of a sterile solution of the steroid in N,N-dimethylformamide (60 mg./ml.) so that the medium is supplemented with 300 μg./ml. of steroid. After 48 hours of further incubation, the contents of the flasks are pooled and filtered through a Seitz clarifying pad. The flasks, mycelium and pad are washed with successive 50 ml. portions of warm water. The combined filtrate and washings have a volume of eleven liters. This is extracted with three 3.3 l. portions of chloroform which are combined, washed twice with 5 l. portions of water and evaporated to dryness in vacuo. The residue (2.3 g.) on crystallization from acetone-hexane gives 1.0 g. of 11β,12β-oxidodesoxycosterone having M.P. about 164–166°; [α]$_D^{22}$ +179° (chlf.);

$\lambda_{max}^{alc.}$ 238 mμ (ε=15,200); $\lambda_{max}^{Nujol}$ 2.96–3.04, 5.88, 6.02, 6.19μ

*Analysis.*—Calcd. for C$_{21}$H$_{28}$O$_4$ (344.44): C, 73.22; H, 8.19. Found: C, 73.02; H, 8.02.

EXAMPLE 3

11β,12β-Oxido-Δ$^{1,4}$-Pregnadiene-21-Ol-3,20-Dione

Following the procedure of Example 2, but substituting 11β,12β-oxido-Δ$^{1,4}$-pregnadiene-3,20-dione for 11β,12β-oxidoprogesterone in the fermentation there is obtained 11β,12β-oxido-Δ$^{1,4}$-pregnadiene-21-ol-3,20-dione.

EXAMPLE 4

11β,12β-Oxido-Δ$^4$-Pregnene-16α,21-Diol-3,20-Dione

A *Streptomyces roseochromogenus* (Waksman No. 3689, The Institute of Microbiology, Rutgers University, New Brunswick, New Jersey) culture is maintained on Gould agar (agar, 20 g.; glucose, 10 g.; yeast extract, 2.5 g.; K$_2$HPO$_4$, 1 g.; distilled water to 1 liter). Inoculum for the first flask stage is prepared by suspending the surface growth from a two-week old agar slant culture with 5 ml. of an 0.01% Dupanol solution. One milliliter portions of inoculum are used to inoculate ten 250 ml. Erlenmeyer flasks, each containing 50 ml. of the following medium (A):

|  | G. |
|---|---|
| Soybean meal | 20 |
| Glucose | 30 |
| Soybean oil | 2.2 |
| Calcium carbonate | 2.5 |
| Distilled water to 1 liter. | |

The flasks are then incubated at 25° on a rotary shaker (280 cycles/minute, 2 inch radius) for 72 hours. After 72 hours, a 10% transfer (by volume) is made to each of 47 250 ml. Erlenmeyer flasks, each containing 50 ml. of the same medium A. At the time of inoculation of these flasks, 25 mg. of steroid is added to each flask using 0.25 ml. per flask of a 100 mg./ml. solution of 11β,12β-oxidodesoxycorticosterone in N,N-dimethylformamide. A total of 1.09 g. of steroid is thereby fermented. After inoculation and supplementation the flasks are then incubated under the same conditions as described above. At approximately 70 hours after steroid addition, the culture broths are harvested. The contents from each flask are pooled and the pooled broth is then adjusted to pH 4.5 using 12 N H$_2$SO$_4$. The acidified broth is then filtered through a Büchner-Seitz clarifying pad apparatus. The filtrate (3000 ml.) is collected and extracted three times with one liter portions of chloroform. The combined chloroform extracts are washed twice with 1.5 l. of water and then evaporated to dryness in vacuo. Crystallization of the residue from acetone-hexane give about 300 mg. of 11β,12β-oxido-Δ$^4$-pregnene-16α,21-diol-3,20-dione having M.P. about 212–214°; [α]$_D^{22}$+158° (chlf.);

$\lambda_{max.}^{alc.}$

*Analysis.*—Calcd. for C$_{21}$H$_{28}$O$_5$ (360.44): C, 69.97; H, 7.83. Found: C, 70.14; H, 8.04.

EXAMPLE 5

11β,12β-Oxido-Δ$^{1,4}$-Pregnadiene-16α,21-Diol-3,20-Dione

Following the procedure of Example 4, but substituting an equivalent amount of 11β,12β-oxido-Δ$^{1,4}$-pregnadiene-21-ol-3,20-dione for the 11β,12β-oxido-Δ$^4$-pregnene-21-ol-3,20-dione in the fermentation, there is obtained 11β,12β-oxido-Δ$^{1,4}$-pregnadiene-16α,21-diol-3,20-dione.

EXAMPLE 6

11β,12β-Oxido-Δ$^4$-Pregnene-16α,21-Diol-3,20-Dione 16,21-Diacetate

A solution of 200 mg. of 11β,12β-oxido-Δ$^4$-pregnene-16α,21-diol-3,20-dione in 3.0 ml. of dry pyridine and 1.0 ml. of acetic anhydride is stoppered and left at room temperature overnight. The solvents are then removed by evaporation, in vacuo, and the residue distributed between chloroform and 2 N HCl. The chloroform is separated, washed with 5% sodium bicarbonate and twice with water and then evaporated to dryness. Crystallization of the residue from acetone-hexane gives 160 mg. of 11β,12β-oxido-Δ$^4$-pregnene-16α,21-diol-3,20-dione 16,21-diacetate having M.P. about 187–188° [α]$_D^{22}$ +144° (chlf.), $\lambda_{max.}^{alc.}$ 238 mμ (ε=17,500)

*Analysis.*—Calcd. for C$_{25}$H$_{32}$O$_7$.H$_2$O (462.53): C, 64.92; H, 7.41. Found: C, 65.28; H, 7.30.

EXAMPLE 7

11β,12β-Oxido-Δ$^{1,4}$-Pregnadiene-16α,21-Diol-3,20-Dione 16,21-Diacetate

Following the procedure of Example 6 but substituting 11β,12β-oxido-Δ$^{1,4}$-pregnadiene-16α,21-diol-3,20-dione for 11β,12β-oxido - Δ$^4$ - pregnene-16α,21-diol-3,20-dione there is obtained 11β,12β-oxido-Δ$^{1,4}$-pregnadiene-16α,21-diol-3,20-dione 16,21-diacetate.

EXAMPLE 8

12α-Fluoro-Δ$^4$-Pregnene-11β,16α,21-Triol-3,20-Dione 16,21-Diacetate

To a stirred solution of 125 mg. of 11β,12β-oxido-Δ$^4$-pregnene-16α,21-diol-3,20-dione 16,21-diacetate in 5 ml. of chloroform and 1.2 ml. of tetrahydrofuran contained in a polyethylene bottle and cooled in an acetone-Dry Ice bath 1 ml. of hydrogen fluoride is added. After 30 minutes the acetone-Dry Ice bath is replaced by an ice bath and the mixture stirred at 0° C. for 5 hours. It is then poured into a mixture of 100 ml. each of chloroform and ice water contained in a polyethylene beaker and neutralized with NaHCO$_3$ with stirring. The chloroform is separated washed with water and evaporated to dryness, in vacuo. The residue is chromatographed on 3 g. of Woelm neutral alumina and elution with chloroform-benzene (1:B) followed by crystallization of the residue from acetone-hexane gives 41.2 mg. of 12α-fluoro-Δ$^4$-pregnene-11β,16α,21-triol-3,20-dione 16,21-diacetate having M.P. about 185–187°, [α]$_D^{22}$ +153° (chlf.);

$\lambda_{max.}^{alc.}$ 238 mμ (216,900)

*Analysis.*—Calcd. for C$_{25}$H$_{33}$O$_7$F (464.51): C, 64.64; H, 7.20; F, 4.09. Found: C, 65.11; H, 6.99; F, 4.54.

EXAMPLE 9

12α-Fluoro-Δ$^{1,4}$-Pregnadiene-11β,16α,21-Triol-3,20-Dione 16,21-Diacetate Following the procedure of Example 8 but substituting 11β,12β-oxido-Δ$^{1,4}$-pregnadiene-16α,21-diol-3,20-dione 16,21-diacetate for 11β,12β-oxido-Δ$^4$-pregnene-16α,21-diol-3,20-dione 16,21-diacetate there is obtained 12α-fluoro-Δ$^{1,4}$-pregnadiene-11β,16α,21-triol-3,20-dione 16,21-diacetate.

EXAMPLE 10

12α-Fluoro-Δ$^4$-Pregnene-11β,16α,21-Triol-3,20-Dione

To a solution of 25 mg. of 12α-fluoro-Δ$^4$-pregnene-11β,16α,21-triol-3,20-dione 16,21-diacetate in 5 ml. of methanol (oxygen free) is added 0.5 ml. of 10% aqueous potassium carbonate and the solution left under nitrogen for 2 hours. The solution is then neutralized with acetic acid diluted with 3 ml. of water and evaporated in vacuo whereupon the 12α-fluoro-Δ$^4$-pregnene-11β,16α,21-triol-3,20-dione crystallizes and is filtered, washed with water and dried.

EXAMPLE 11

12α-Fluoro-Δ$^{1,4}$-Pregnadiene-11β,16α,21-Triol-3,20-Dione

Following the procedure of Example 10 but substituting 12α,fluoro-Δ$^{1,4}$-pregnane-11β,16α,21-triol-3,20-dione-16,21-diacetate for 12α-fluoro-Δ$^4$-pregnene-11β,16α,21-triol-3,20-dione 16,21-diacetate there is obtained 12α-fluoro-Δ$^{1,4}$-pregnadiene-11β,16α,21-triol-3,20-dione.

EXAMPLE 12

*11β,12β-Oxido-21-Chloro-Δ$^{4,16}$-Pregnadiene-3,20-Dione*

To a cold solution of 240 mg. of 11β,12β-oxido-Δ$^4$-pregnene-16α,21-diol-3,20-dione in 15 ml. of dry pyridine, 0.6 ml. of methanesulfonyl chloride is added dropwise. The reaction mixture is stoppered and kept at 5° C. for 2 hours following which crushed ice is added to decompose the excess methanesulfonyl chloride. The mixture is then distributed between chloroform and water. The chloroform is separated, washed successively with 2 N HCl, 5% NaHCO$_3$ and water and evaporated to dryness in vacuo. The residue is chromatographed on 6 g. of Florisil. Elution with benzene, evaporation of the solvent in vacuo and crystallization from acetone-hexane gives 100 mg. of 11β,12β-oxido-21-chloro-Δ$^{4,16}$-pregnadiene-3,20-dione having M.P. about 182–184°; $[α]_D^{23}$ +240° (chlf.);

$λ_{max.}^{alc.}$ 239 mμ (ε=24,200); $λ_{max.}^{Nujol}$ 5.90, 6.01, 6.20, 6.32μ

*Analysis.*—Calcd. for C$_{21}$H$_{25}$O$_3$Cl (360.86): C, 69.89; H, 6.98; Cl, 9.83. Found: C, 70.77; H, 7.28; Cl, 9.77.

EXAMPLE 13

*11β,12β-Oxido-21-Chloro-Δ$^{1,4,16}$-Pregnatriene-3,20-Dione*

Following the procedure of Example 12, but substituting 11β,12β-oxido-Δ$^{1,4}$-pregnadiene-16α,21-diol-3,20-dione for the 11β,12β-oxido-Δ$^4$-pregnene-16α,21-diol-3,20-dione there is obtained 11β,12β-oxido-21-chloro-Δ$^{1,4,16}$-pregnatriene-3,20-dione.

EXAMPLE 14

*12α-Fluoro-21-Chloro-Δ$^{4,16}$-Pregnadiene-11β-Ol-3,20-Dione*

Following the procedure of Example 12, but substituting 12α-fluoro-Δ$^4$-pregnene-11β,16α,21-triol-3,20-dione for the 11β,12β-oxido-Δ$^4$-pregnene-16α,21-diol-3,20-dione there is obtained 12α-fluoro-21-chloro-Δ$^{4,16}$-pregnadiene-11β-ol-3,20-dione.

EXAMPLE 15

*12α-Fluoro-21-Chloro-Δ$^{1,4,16}$-Pregnatriene-11β-Ol-3,20-Dione*

Following the procedure of Example 12, but substituting 12α-fluoro-Δ$^{1,4}$-pregnadiene-11β,16α,21-triol-3,20-dione for the 11β,12β-oxido-Δ$^4$-pregnene-16α,21-diol-3,20-dione there is obtained 12α-fluoro-21-chloro-Δ$^{1,4,16}$-pregnatriene-11β-ol-3,20-dione.

EXAMPLE 16

*11β,12β-Oxido-Δ$^{4,16}$-Pregnadiene-21-Ol-3,20-Dione 21-Acetate*

To a solution of 699 mg. of 11β,12β-oxido-21-chloro-Δ$^{4,16}$-pregnadiene-3,20-dione in 150 ml. of acetone containing 0.075 ml. of acetic acid, 640 mg. each of potassium iodide and freshly fused potassium acetate are added. The mixture is protected from moisture and refluxed on a steam bath for 16 hours. After cooling the mixture is filtered and washed well with acetone. The filtrate is diluted with 150 ml. of water and on concentration of the solution in vacuo crystals separate which are filtered, washed with water and dried to give 638 mg. of 11β,12β-oxido-Δ$^{4,16}$-pregnadiene-21-ol-3,20-dione 21-acetate, M.P. about 170–171°; $[α]_D^{22}$ +228° (chlf.);

$λ_{max.}^{alc.}$ 239 mμ (ε=27,800); $λ_{max.}^{Nujol}$ 5.72, 5.98, 6.01, 6.19, 6.31μ

*Analysis.*—Calcd. for C$_{23}$H$_{28}$O$_5$ (384.45): C, 71.85; H, 7.34. Found: C, 71.94; H, 7.27.

EXAMPLE 17

*11β,12β-Oxido-Δ$^{1,4,16}$-Pregnatrien-21-Ol-3,20-Dione 21-Acetate*

Following the procedure of Example 16 but substituting 11β,12β-oxido-21-chloro-Δ$^{1,4,16}$-pregnatriene-3,20-dione for the 11β,12β-oxido-21-chloro-Δ$^{4,16}$-pregnadiene-3, 20-dione, there is obtained 11β,12β-oxido-Δ$^{1,4,16}$-pregnatriene-21-ol-3,20-dione 21-acetate.

EXAMPLE 18

*12α,Fluoro-Δ$^{4,16}$-Pregnadiene-11β,21-Diol-3,20-Dione 21-Acetate*

Following the procedure of Example 16 but substituting 12α-fluoro-21-chloro-Δ$^{4,16}$-pregnadiene-11β-ol-3,20-dione for the 11β,12β-oxido-21-chloro-Δ$^{4,16}$-pregnadiene-3,20-dione, there is obtained 12α-fluoro-Δ$^{4,16}$-pregnadiene-11β,21-diol-3,20-dione 21-acetate.

EXAMPLE 19

*12α-Fluoro-Δ$^{1,4,16}$-Pregnatriene-11β,21-Diol-3,20-Dione 21-Acetate*

Following the procedure of Example 16, but substituting 12α-fluoro-21-chloro-Δ$^{1,4,16}$-pregnatriene-11β-ol-3,20-dione for the 11β,12β-oxido-21-chloro-Δ$^{4,16}$-pregnadiene-3,20-dione, there is obtained 12α-fluoro-Δ$^{1,4,16}$-pregnatriene-11β,21-diol-3,20-dione 21-acetate.

EXAMPLE 20

*11β,12β-Oxido-Δ$^{4,16}$-Pregnadiene-21-Ol-3,20-Dione*

Following the procedure of Example 10, but substituting 11β,12β-oxido-Δ$^{4,16}$-pregnadien-21-ol-3,20-dione 21-acetate for the 12α-fluoro-Δ$^4$-pregnene-11β,16α,21-triol-3,20-dione 16,21-diacetate, there is obtained 11β,12β-oxido-Δ$^{4,16}$-pregnadiene-21-ol-3,20-dione.

Similarly, 11β,12β-oxido-Δ$^{1,4,16}$-pregnatriene-21-ol-3,20-dione 21-acetate, 12α-fluoro-Δ$^{4,16}$-pregnadiene-11β,21-diol-3,20-dione 21-acetate and 12α-fluoro-Δ$^{1,4,16}$-pregnatriene-11β,21-diol-3,20-dione 21-acetate are hydrolyzed to their respective 21-hydroxy derivatives.

EXAMPLE 21

*12α-Fluoro-Δ$^{4,16}$-Pregnadiene-11β,21-Diol-3,20-Dione 21-Acetate*

To a stirred solution of 64.4 mg. of 11β,12β-oxido-Δ$^{4,16}$-pregnadiene-21-ol-3,20-dione 21-acetate in 5 ml. of chloroform and 1.2 ml. of tetrahydrofuran contained in a polyethylene bottle and cooled by means of an acetone-Dry Ice bath, 1.0 ml. of hydrogen fluoride is pipetted by means of a polyethylene pipette. The reaction vessel is stoppered and left at −5° C. for 5 hours and then poured into a polyethylene beaker containing 50 ml. each of chloroform and ice water. The mixture is neutralized with sodium bicarbonate, the chloroform separated, washed with water and evaporated to dryness in vacuo. The residue is chromatographed on Woelm neutral alumina. Elution with 10% chloroform in benzene and crystallization of the residue gives 20 mg. of 12α-fluoro-Δ$^{4,16}$-pregnadiene-11β,21-diol-3,20-dione-21-acetate, M.P. about 174–175°; $[α]_D^{22}$ +183° (chlf.);

$λ_{max.}^{alc.}$ 239 mμ (ε=26,300); $λ_{max.}^{Nujol}$ 2.86, 5.70, 5.98, 6.01, 6.16, 6.28μ

*Analysis.*—Calcd. for C$_{23}$H$_{29}$O$_5$F (404.46); C, 68.29; H, 7.22; F, 4.70. Found: C, 68.42; H, 7.55; F, 5.09.

EXAMPLE 22

*12α-Fluoro-Δ$^{1,4,16}$-Pregnatriene-11β,21-Diol-3,20-Dione 21-Acetate*

Following the procedure of Example 21, but substituting 11β,12β-oxido-Δ$^{1,4,16}$-pregnatriene-21-ol-3,20-dione 21-acetate for 11β,12β-oxido-Δ$^{4,16}$-pregnadiene-21-ol-3,20-dione 21-acetate, there is obtained 12α-fluoro-Δ$^{1,4,16}$-pregnatriene-11β,21-diol-3,20-dione 21 acetate.

EXAMPLE 23

*12α-Chloro-Δ$^{4,16}$-Pregnadiene-11β,21-Diol-3,20-Dione 21-Acetate*

Following the procedure of Example 21 but substituting hydrogen chloride for the hydrogen fluoride, 12α- chloro-Δ4,16-pregnadiene-11β-21-diol-3,20-dione 21-acetate is obtained.

Similarly, hydrogen bromide yields 12α-bromo-Δ4,16-pregnadiene-11β,21-diol-3,20-dione 21-acetate and hydrogen iodide yields 12α-iodo-Δ4,16-pregnadiene-11β,21-diol-3,20-dione 21 acetate.

EXAMPLE 24

*12α-Fluoro-16α-Hydroxyhydrocortisone-21-Acetate*

To a stirred solution of 25.4 mg. (0.063 mmol) of 12α - fluoro - Δ4,16 - pregnadiene - 11β,21 - diol - 3,20-dione 21-acetate in 4 ml. of benzene containing 0.2 ml. of pyridine a solution of 16.7 mg. (0.066 mmol) of osmium tetroxide in 0.82 ml. of benzene is added dropwise over a ten minute period. The solution is stirred at room temperature and after 45 minutes a precipitate separates. The stirring is continued for 2½ hours and then 4 ml. of an aqueous solution containing .36 g. each of sodium sulfite and potassium bicarbonate which is free of oxygen is added followed by 2 ml. of methanol. The mixture is then stirred under nitrogen for 3 hours, filtered, and washed thoroughly with chloroform and warm tetrahydrofuran. The filtrate is washed with water and evaporated to dryness in vacuo. Crystallization of the residue from acetone-hexane gives 10 mg. of 12α-fluoro-16α-hydroxyhydrocortisone 21-acetate, M.P. about 204–206°; [α]$^{22}$ +101° (chlf.);

$\lambda_{max.}^{alc.}$ 239 mμ (ε=16,500); $\lambda_{max.}^{Nujol}$ 2.76, 2.88, 3.00, 5.80, 6.03, 6.19μ

*Analysis.*—Calcd. for $C_{23}H_{31}O_7F$ (438.48): C, 62.99; H, 7.13. Found: C, 62.38; H, 7.57.

EXAMPLE 25

*12α-Fluoro-16α-Hydroxyprednisolone 21-Acetate*

Following the procedure of Example 24 but substituting 12α-fluoro-Δ1,4,16-pregnatriene-11β,21-diol-3,20-dione 21-acetate for 12α-fluoro-Δ4,6-pregnadiene-11β,21-diol-3,20-dione 21-acetate there is obtained 12α-fluoro-16α-hydroxyprednisolone 21-acetate.

This invention may be variously otherwise embodied within the scope of the appended claims.

What is claimed is:

1. A compound selected from the group consisting of steroids of the general formula

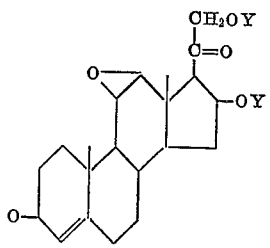

and the 1,2-dehydro derivatives thereof, wherein Y is selected from the group consisting of hydrogen and the acyl radical of a hydrocarbon carboxylic acid of less than twelve carbon atoms.

2. 11β,12β - oxido - Δ4 - pregnene - 16α,21 - diol - 3,20-dione.

3. 11β,12β - oxido - Δ1,4 - pregnadiene - 16α,21 - diol-3,20-dione.

4. 11β,12β - oxido - Δ4 - pregnene - 16α,21 - diol - 3,20-dione 16,21-diacetate.

5. A compound selected from the group consisting of 11β,12β-oxido-21-halo-Δ4,16-pregnadiene-3,20-dione and 11β,12β - oxido - 21 - halo - Δ1,4,16 - pregnatriene - 3,20-dione, wherein the 21-halo is selected from the group consisting of chlorine, bromine and iodine.

6. 11β,12β - oxido - 21 - chloro - Δ4,16 - pregnadiene-3,20-dione.

7. A compound selected from the group consisting of steroids of the general formula

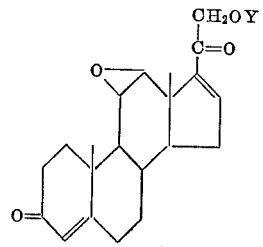

and the 1,2-dehydro derivatives thereof, wherein Y is selected from the group consisting of hydrogen and the acyl radical of a hydrocarbon carboxylic acid of less than twelve carbon atoms.

8. 11β,12β-oxido-Δ4,16-pregnadiene-21-ol-3,20-dione 21-acetate.

9. 11β,12β-oxido-Δ4,16-pregnadiene-21-ol-3,20-dione.

10. 11β,12β - oxido - Δ1,4,16 - pregnatriene - 21 - ol - 3,20-dione 21-acetate.

11. 11β,12β - oxido - Δ1,4,16 - pregnatriene - 21 - ol -3,20-dione.

12. A compound selected from the group consisting of 12α-fluoro-21-halo-Δ4,16-pregnadiene-11β-ol-3,20-dione and 12α-fluoro-21-halo-Δ1,4,16-pregnatriene-11β-ol-3,20-dione, wherein the 21-halo is selected from the group consisting of chlorine, bromine and iodine.

13. 12α-fluoro-21-chloro-Δ4,16-pregnadiene-11β-ol-3,20-dione.

14. A compound selected from the group consisting of steroids of the general formula

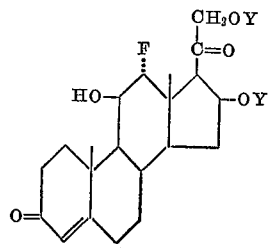

and the 1,2-dehydro derivatives thereof, wherein Y is selected from the group consisting of hydrogen and the acyl radical of a hydrocarbon carboxylic acid of less than twelve carbon atoms.

15. 12α-fluoro-Δ4-pregnene-11β,16α,21-triol-3,20-dione 16,21-diacetate.

16. 12α-fluoro-Δ4-pregnene-11β,16α,21-triol-3,20-dione.

17. A process for preparing a steroid of claim 5 which comprises interacting a corresponding dihydroxy steroid of claim 1 with a sulfonyl halide in the presence of a base and recovering the 16-dehydro-21-halo steroid formed.

18. A process for preparing a steroid of claim 7 which comprises interacting a corresponding steroid of claim 5 with a salt of a hydrocarbon carboxylic acid of less than twelve carbon atoms in the presence of an alkali metal iodide and recovering the 21-ester formed.

No references cited.

UNITED STATES PATENT OFFICE
CERTIFICATE OF CORRECTION

Patent No. 3,060,176                          October 23, 1962

Patrick A. Diassi et al.

It is hereby certified that error appears in the above numbered patent requiring correction and that the said Letters Patent should read as corrected below.

Column 9, line 27, for "$[\alpha]^{22}$" read -- $[\alpha]_D^{22}$ --; lines 47 to 58, the formula should appear as shown below instead of as in the patent:

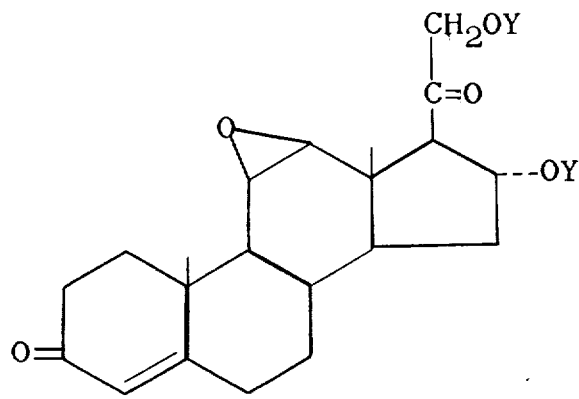

Signed and sealed this 2nd day of April 1963.

(SEAL)
Attest:

ESTON G. JOHNSON                          DAVID L. LADD
Attesting Officer                          Commissioner of Patents